UNITED STATES PATENT OFFICE.

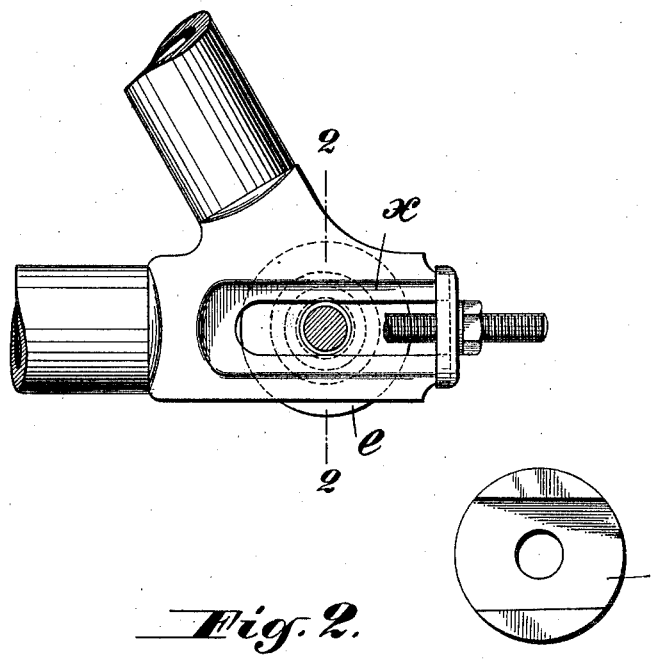
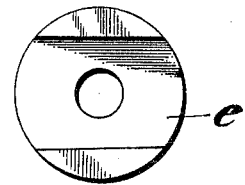
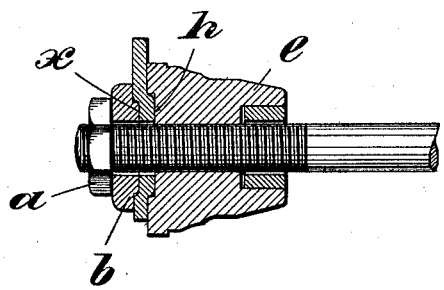

OTTO SCHLICK, OF BERLIN, GERMANY.

BACK-PEDALING BRAKE.

1,037,057.  Specification of Letters Patent.  Patented Aug. 27, 1912.

Application filed April 6, 1911. Serial No. 619,268.

*To all whom it may concern:*

Be it known that I, OTTO SCHLICK, a subject of the King of Saxony, and whose post-office address is Steinmetzstrasse 31, in the city of Berlin, Kingdom of Prussia, German Empire, have invented new and useful Improvements in Back-Pedaling Brakes, of which the following is a specification.

My invention relates to an improvement in the class of back-pedaling brakes for cycle hubs in which the locking of the brake bearing cone screwed on the end of the axle inside the hub is effected without the aid of a lever secured to the forked frame by a collar.

The object of my invention is to connect the said bearing cone with the rear fork in such a manner, that when screwing on the fastening nut both shanks of the forked head are held absolutely fixed both against an inward bending and against an outward bending between the said bearing cone and a washer inserted between the fork head and the fastening nut.

Referring to the accompanying drawing Figure 1 shows a side elevation and Fig. 2 a section according to line 2—2 of the improved connection. Fig. 3 is a front elevation of the bearing cone shown in Figs. 1 and 2.

The bearing cone $e$, screwed on the end of the axle $s$ inside the hub (not shown), has at its face adjacent to the forked head of the rear fork a groove $h$ corresponding with a shoulder formed on the washer $b$. The forked head is provided with an offset portion $x$ which engages on one side with the shoulder on the washer $b$, and on the other side with the groove $h$ on the bearing cone $e$. In consequence when the fastening nut $a$ is screwed on, the shanks of the forked head are held immovable between the bearing cone $e$ and the washer $b$. They cannot bend inwardly because the shoulder of the washer $b$ prevents this and also they cannot bend outwardly because the groove $h$ of the bearing cone $e$ clamps them from both sides.

Obviously the arrangement of the shoulder of the washer $b$ and the groove $h$ of the bearing cone $e$ can be exchanged *i. e.* the bearing cone $e$ can be provided with a shoulder and the washer $b$ with a groove, both corresponding with the longitudinal depression $x$ of the forked head.

What I do claim as my invention, and desire to secure by Letters Patent of the United States, is:—

1. In a back pedaling brake for cycle hubs the combination of a forked head of the cycle frame having a longitudinal depression on one side, and a corresponding shoulder on the other side, a brake bearing cone screwed on the axle of the hub and having on the side adjacent to the forked head a groove engaged by the said shoulder, a washer having on the side adjacent to the fork a shoulder engaging the said depression and means for clamping the parts together.

2. In a back pedaling brake for cycle hubs the combination of a forked head of the cycle frame having a longitudinal depression on one side, and a corresponding shoulder on the other side, a brake bearing cone screwed on the axle of the hub and having on the side adjacent to the forked head a groove engaged by the said shoulder, a washer having on the side adjacent to the fork a shoulder engaging the said depression and a fastening nut for clamping the washer and the forked head against the brake bearing cone.

In testimony whereof I have hereunto set my hand in presence of two subscribing witnesses.

OTTO SCHLICK.

Witnesses:
 WOLDEMAR HAUPT,
 HENRY HASPER.

Copies of this patent may be obtained for five cents each, by addressing the "Commissioner of Patents, Washington, D. C."